United States Patent Office 3,630,940
Patented Dec. 28, 1971

3,630,940
**2-MERCAPTOBENZOTHIAZOLE/TETRAALKYL-
THIURAM DISULFIDE MIXTURE**
Richard Leshin, Akron, Ohio, assignor to The Goodyear
Tire & Rubber Company, Akron, Ohio
No Drawing. Filed Apr. 28, 1969, Ser. No. 819,970
Int. Cl. C08c *11/56, 11/62*
U.S. Cl. 252—182                             15 Claims

ABSTRACT OF THE DISCLOSURE

Process of preparing a mixture of 2-mercaptobenzothiazole and tetraalkylthiuram disulfide in an aqueous medium involving the forming of a tetraalkylthiuram disulfide slurry containing a reducing agent prior to incorporating the 2-mercaptobenzothiazole with the tetraalkylthiuram disulfide slurry.

---

This invention relates to a process of preparing a mixture of 2-mercaptobenzothiazole and a thiuram disulfide. More particularly this invention relates to the preparation of a 2-mercaptobenzothiazole/tetraalkylthiuram disulfide mixture in an aqueous medium.

Mixtures of 2-mercaptobenzothiazole and tetraalkylthiuram disulfide are known to be effective accelerator compositions in the sulfur vulcanization of diene rubbers. Tetraalkylthiuram disulfides can be produced by oxidizing a water-soluble dialkyl dithiocarbamate salt in an aqueous medium using oxidizing agents such as nitrous acid, hydrogen peroxide and sulfuric acid, iodine or ammonium persulfate. Such a method results in a slurry of the tetraalkylthiuram disulfide which contains residual oxidizing agents. For example, when nitrous acid is used as the oxidizing agent, the tetraalkylthiuram disulfide slurry contains residual oxides of nitrogen. A conventional method of preparing the powdered form of the mixtures involves the use of dry mixing equipment to mix the dry components. A process which would not require the use of dry mixing equipment is desirable. In a conventional method of preparing the rod form of the mixtures the compounds are prepared separately, individually dried, slurried together in an aqueous medium in the presence of conventional rod forming binders, extruded, and dried again. It is desirable from an economic standpoint in the rod-forming process to eliminate at least one of the individual drying steps involved in the drying of the individual components prior to slurrying, extrusion and drying.

It is an object of the present invention to provide a process for preparing a mixture of 2-mercaptobenzothiazole and a tetraalkylthiuram disulfide.

This object of the present invention is accomplished by a process comprising forming an aqueous slurry of at least one tetraalkylthiuram disulfide having the following structural formula:

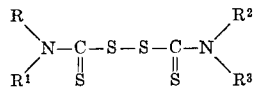

wherein R, R¹, R² and R³ are alkyl radicals having from 1 to 3 carbon atoms containing a reducing agent capable of providing sulfur dioxide in an amount sufficient to form an aqueous slurry which is substantially free of residual oxidizing agents and then incorporating in said slurry 2-mercaptobenzothiazole or a compound capable of forming 2-mercaptobenzothiazole in the presence of an acid with the proviso that the compound capable of forming 2-mercaptobenzothiazole be incorporated under nonoxidizing, acidic conditions sufficient to generate said 2-mercaptobenzothiazole.

It has been discovered that when 2-mercaptobenzothiazole is combined with an aqueous tetraalkylthiuram disulfide slurry containing residual oxidizing agents the resultant mixture contains an amount of 2-mercaptobenzothiazole which is much less than the amount of 2-mercaptobenzothiazole charged. It is theorized that the residual oxidizing agents in the tetraalkylthiuram disulfide slurry result in the conversion of a large portion of the 2-mercaptobenzothiazole to benzothiazolyl disulfide. By the addition of specific reducing agents to the tetraalkylthiuram disulfide slurry prior to its combination with the 2-mercaptobenzothiazole, whether the 2-mercaptobenzothiazole is added directly or is prepared in situ by the acidification of the water-soluble salt of 2-mercaptobenzothiazole, this problem has been solved. It is therefore now possible to produce powdered 2-mercaptobenzothiazole/tetraalkylthiuram disulfide mixtures without using dry mixing equipment. It is also now possible to produce 2-mercaptobenzothiazole/tetraalkylthiuram disulfide mixtures which are capable of being extruded into rod form with a reduced number of drying steps, i.e., without drying both of the components separately prior to slurrying.

The process normally involves the use of either 2-mercaptobenzothiazole or a water-soluble salt of 2-mercaptobenzothiazole such as the sodium or potassium salt. In either case a satisfactory procedure involves the oxidation of a dialkyldithiocarbamate, such as sodium dimethyldithiocarbamate, in an aqueous medium in the presence of an oxidizing agent such as nitrous acid, hydrogen peroxide and sulfuric acid, iodine or ammonium persulfate to form an aqueous slurry of a tetraalkylthiuram disulfide such as tetramethylthiuram disulfide, tetraethylthiuram disulfide or tetraisopropylthiuram disulfide. Such a freshly prepared slurry of the tetraalkylthiuram disulfide contains residual oxidizing agent, such as oxides of nitrogen, when nitrous acid is used as the oxidizing agent. The oxides of nitrogen can be removed from the slurry by allowing the slurry to stand for an extended period of time, for example, from one to three days. Commercially, such a method of removing the oxides of nitrogen is very impractical, time consuming and expensive. A reducing agent, preferably water soluble, is combined with the aqueous slurry of tetraalkylthiuram disulfide which contains the residual oxidizing agent. The reducing agents to be used are those which provide sulfur dioxide, i.e., those which are a sulfur dioxide source. These reducing agents are represented by sulfur dioxide gas, sulfurous acid, and alkali sulfites and alkali bisulfites such as sodium sulfite, potassium sulfite, sodium bisulfite and potassium bisulfite. The 2-mercaptobenzothiazole is then added directly to the slurry or formed in situ in the slurry by the acidification of a water-soluble salt of the 2-mercaptobenzothiazole in the aqueous slurry. The 2-mercaptobenzothiazole or its water-soluble salt may be added to the tetraalkylthiuram disulfide slurry in a number of different forms. That is, for example, the 2-mercaptobenzothiazole or its precursor can be added directly to the slurry in many degrees of dryness, for instance from a dry to an aqueous form.

Examples of water-soluble salts of 2-mercaptobenzothiazole which may be used in the practice of the present invention include sodium 2-benzothiazolylmercaptide, potassium 2-benzothiazolylmercaptide and ammonium 2-benzothiazolylmercaptide.

The acidic conditions under which the 2-mercaptobenzothiazole is formed in situ in the tetraalkylthiuram disulfide slurry must be nonoxidizing in nature, since the 2-mercaptobenzothiazole under oxidation conditions will form benzothiazolyl disulfide. In order to create nonoxidizing, acidic conditions in the slurry, water-soluble, nonoxidizing acids may be added to the tetraalkylthiuram disulfide slurry prior to the addition of the water-soluble salt of 2-mercaptobenzothiazole. These acids include hydrochloric acid, sulfuric acid, phosphoric acid and acetic acid. The acids may be added to the tetraalkylthiuram disulfide slurry in various concentrations. The nonoxidizing, acidic conditions sufficient to convert the water-soluble salt of 2-mercaptobenzothiazole to 2-mercaptobenzothiazole vary, depending on the amount of the water-soluble salt of 2-mercaptobenzothiazole that is to be converted. Normally a slurry pH below about 7.0 is adequate, a pH below about 6.0 being preferred. The amount of acidic material to be used in order to convert the water-soluble salt of 2-mercaptobenzothiazole to the 2-mercaptobenzothiazole should normally be at least equal to the theoretical amount necessary for such a conversion. Preferably the amount of acidic material is slightly in excess of the theoretical amount. However, even higher amounts of acid may be used if desired. Normally from about 1.0 to about 1.2 equivalents of acid per mol of the water-soluble salt of 2-mercaptobenzothiazole is adequate. The acid may be added in pure form or in the form of an aqueous solution.

The amount of reducing agent need only be sufficient to substantially destroy the oxidizing agents present in the tetraalkylthiuram disulfide slurry. However, higher amounts of reducing agent may be used if desired. That is, the amount of reducing agent which is sufficient to form an aqueous tetraalkylthiuram disulfide slurry which is substantially free of oxidizing agents will vary, depending on the amount of oxidizing agent present in the slurry. Normally from about 1 to about 15 grams of a reducing agent per 100 grams of tetraalkylthiuram disulfide in the slurry is adequate. The reducing agent may be added in many degrees of dryness, for instance, from a dry to an aqueous form.

Where the 2-mercaptobenzothiazole is formed in situ, the order of the addition of the reducing agent and acid to the tetraalkylthiuram disulfide slurry may vary. However, preferably the reducing agent is added first, followed by the addition of the acid.

General references herein to the use of a tetraalkylthiuram disulfide, a water-soluble salt of 2-mercaptobenzothiazole, a reducing agent, or an acid are meant to include mixtures of tetraalkylthiuram disulfides, mixtures of water-soluble salts of 2-mercaptobenzothiazole, mixtures of reducing agents and mixtures of acids. Likewise, if desired, a portion of 2-mercaptobenzothiazole can be added directly while another portion can be prepared in situ as described herein. The concentration of the tetraalkylthiuram disulfide slurry; the concentration of the aqueous slurry of the 2-mercaptobenzothiazole, if added as an aqueous slurry; and the concentration of the aqueous solution of the water-soluble salt of 2-mercaptobenzothiazole, if added as an aqueous solution, may be varied. However, it is preferred that the tetraalkylthiuram disulfide slurry have a concentration of from about 1 weight percent to about 15 weight percent, and the aqueous solution of the water-soluble salt of 2-mercaptobenzothiazole have a concentration of about 5 to about 50 weight percent. The ratio of the 2-mercaptobenzothiazole to the thiuram disulfide may also be varied. For example, the weight ratio of the 2-mercaptobenzothiazole to the tetraalkylthiuram disulfide can be from about 1:9 to about 9:1. A preferred range is from about 1:4 to about 1:1.

After the 2-mercaptobenzothiazole/tetraalkylthiuram disulfide slurry is formed it may be filtered and dried to form a powdery mixture. However, if desired, it may be filtered and then extruded to form rod forms and then dried. Normally when rod forms are produced, conventional rod forming binders are added to the slurry prior to filtration. When drying the 2-mercaptobenzothiazole/tetraalkylthiuram disulfide mixture care should be taken not to degrade the mixture through the use of excessive temperatures. For example, although a 2-mercaptobenzothiazole/tetramethylthiuram dislfide mixture can normally be dried without adverse effects at 65° C., a drying temperature of 100° C. can often result in degradation.

The following examples are intended to include illustrations of the practice of the process of the present invention but are not intended to be limiting as to the invention described herein. All parts and percentages are by weight unless otherwise indicated.

EXAMPLES 1 AND 2

To two 60 milliliter aliquots of an aqueous slurry of tetramethylthiuram disulfide containing about 5.5 weight percent of tetramethylthiuram disulfide and prepared by the oxidation of sodium dimethyldithiocarbamate in the presence of nitrous acid in an aqueous medium, said slurry containing residual oxides of nitrogen, as demonstrated by a positive test with acidified Starch-KI paper, was added 1.6948 grams (Example 1) and 1.6840 grams (Example 2) of dry 2-mercaptobenzothiazole with agitation. The slurries were allowed to stand in a closed container overnight. The slurries were filtered, and the products water washed and dried overnight in an air drying oven at about 40° C.

EXAMPLES 3 AND 4

To 434 grams of an aqueous slurry of tetramethylthiuram disulfide containing about 5.5 percent of tetramethylthiuram disulfide prepared by the oxidation of sodium dimethyldithiocarbamate in an aqueous medium in the presence of nitrous acid, said slurry containing residual oxides of nitrogen, was added approximately 0.75 gram of sodium bisulfide with agitation. A negative test at this point with acidified Starch-KI paper indicated that the slurry was now free of residual oxides of nitrogen. To two 120 milliliter portions of the sodium bisulfite treated slurry were added 1.6885 grams (Example 3) and 1.6750 grams (Example 4) of dry 2-mercaptobenzothiazole with agitation. The slurries were allowed to stand in a closed container overnight. The slurries were then filtered and the products water washed and dried overnight in an air drying oven at about 40° C.

EXAMPLES 5 AND 6

Examples 5 and 6 were similar to Examples 3 and 4 with the exception that 1.6966 grams (Example 5) and 1.6864 grams (Example 6) of dry 2-mercaptobenzothiazole were added to 60 milliliters of the sodium bisulfide treated slurry of tetramethylthiuram disulfide. All of the products were analyzed for their 2-mercaptobenzothiazole content by placing 3 to 4 grams in 100 milliliters of methanol and titrating with 0.5 N sodium hydroxide to a pH of 10.1.

The results are listed in Table I.

TABLE I

| | Weight percent of 2-mercaptobenzothiazole in mixture | |
| --- | --- | --- |
| | Theoretical [1] | Experimental [2] |
| Example: | | |
| 1 | 34 | 20 |
| 2 | 34 | 21 |
| 3 | 21 | 20 |
| 4 | 21 | 20 |
| 5 | 34 | 31 |
| 6 | 34 | 33 |

[1] Based on 2-mercaptobenzothiazole added.
[2] Based on analysis of the total organic solids.

Examples 1 and 2 are duplicate runs of a process which is not within the scope of the present invention. They involve the addition of dry 2-mercaptobenzothiazole to a slurry of tetramethylthiuram disulfide, containing residual oxides of nitrogen, to which no reducing agent had been added. The charged weight ratio of 2-mercaptobenzothiazole to the tetramethylthiuram disulfide was 1:2. Examples 3, 4, 5 and 6 illustrate the practice of the present invention and involve a process wherein sodium bisulfite was added to the tetramethylthiuram disulfide slurry, containing residual oxides of nitrogen, prior to the addition of the dry 2-mercaptobenzothiazole to the slurry. Examples 3 and 4 were duplicate runs where the charged weight ratio of the 2-mercaptobenzothiazole to the tetramethylthiuram disulfide was 1:4. Examples 5 and 6 are duplicate runs of the process where the charged weight ratio of the 2-mercaptobenzothiazole to the tetramethylthiuram disulfide was 1:2. Therefore, Examples 3, 4, 5 and 6 illustrate the practice of the present invention where the 2-mercaptobenzothiazole is added directly to the tetramethylthiuram disulfide slurry.

As indicated by the above data, when an aqueous slurry of tetramethylthiuram disulfide containing residual oxides of nitrogen is combined with 2-mercaptobenzothiazole (Examples 1 and 2) a large portion of the 2-mercaptobenzothiazole is found to be missing from the 2-mercaptobenzothiazole/tetramethylthiuram disulfide mixture. This is believed to be due to the oxidation of a portion of the 2-mercaptobenzothiazole to benzothiazolyl disulfide. As noted in Examples 3 through 6, when the tetramethylthiuram disulfide slurry, containing residual oxides of nitrogen, is treated with sodium bisulfite prior to the addition of the 2-mercaptobenzothiazole, the resultant mixture contains approximately the theoretical amount of 2-mercaptobenzothiazole.

EXAMPLE 7

To 355 grams of an aqueous slurry of tetramethylthiuram disulfide containing about 5.5 weight percent of tetramethylthiuram disulfide and prepared by the oxidation of sodium dimethyldithiocarbamate in the presence of nitrous acid in an aqueous medium and containing residual oxides of nitrogen, are added 6.1 grams of 50 weight percent $H_2SO_4$. Then 22.63 grams of 50 weight percent aqueous solution of the sodium salt of 2-mercaptobenzothiazole are added. 2-mercaptobenzothiazole precipitates within the slurry immediately. The slurry is allowed to stand in a closed container overnight. The product is filtered, water washed and dried overnight in an air drying oven at about 40° C. The weight of organic solids is almost the theoretical amount. However, a significant amount of the theoretical amount of the 2-mercaptobenzothiazole is not found to be present upon analysis.

EXAMPLE 8

To 355 grams of the slurry of tetramethylthiuram disulfide of Example 7, which contains residual oxides of nitrogen, is added one gram of sodium bisulfite, and the mixture is stirred 15 minutes. To this slurry are added 6.1 grams of 50 weight percent $H_2SO_4$ with stirring. Then, 22.63 grams of 50 weight percent aqueous sodium 2-benzothiazolyl mercaptide are added. 2-mercaptobenzothiazole precipitates as in Example 7. The slurry was allowed to stand in a closed container overnight. The product is filtered, water washed and dried overnight in an air drying oven at about 40° C. The weight of organic solids is almost the theoretical amount. Upon analysis essentially all of the charged sodium salt of 2-mercaptobenzothiazole is fouund to be present in the mixture in the form of 2-mercaptobenzothiazole.

Example 7 illustrates the preparation of a 2-mercaptobenzothiazole/tetramethylthiuram disulfide slurry where an aqueous solution of the sodium salt of 2-mercaptobenzothiazole is added to an acidified slurry of tetramethylthiuram disulfide containing residual oxides of nitrogen. Example 8 is identical to Example 7 with the exception that a sulfur dioxide releasing reducing agent is added to the tetramethylthiuram disulfide slurry prior to the addition of the sodium salt of 2-mercaptobenzothiazole. Therefore Example 7 illustrates a process outside the scope of the present invention, while Example 8 illustrates the practice of the present invention where the 2-mercaptobenzothiazole is formed in situ within the tetramethylthiuram disulfide slurry. In both Examples 7 and 8 the sodium salt is charged in an amount so as to provide, on acidification of the salt, a charged weight ratio of 2-mercaptobenzothiazole to tetramethylthiuram disulfide of 1:2.

As indicated in the above examples, when an acidified aqueous slurry of tetramethylthiuram disulfide containing residual oxides of nitrogen is combined with the sodium salt of 2-mercaptobenzothiazole (Example 7) a large portion of the 2-mercaptobenzothiazole is found to be missing from the 2-mercaptobenzothiazole/tetramethylthiuram disulfide mixture. This is believed to be due to the oxidation of a portion of the 2-mercaptobenzothiazole to benzothiazolyl disulfide. It is noted in Example 8 when the tetramethylthiuram disulfide slurry containing residual oxides of nitrogen is treated with sodium bisulfite prior to the addition of the sodium salt of 2-mercaptobenzothiazole, the resultant mixture contains approximately the theoretical amount of 2-mercaptobenzothiazole.

The other tetraalkylthiuram disulfides, acids, water-soluble salts of 2-mercaptobenzothiazole and reducing agents described earlier herein may be substituted for the specific compounds described in the aforementioned working examples to obtain results similar to those described in said working examples.

While certain representative embodiments and details have been shown for the purpose of illustrating the invention it will be apparent to those skilled in this art that various changes and modifications may be made therein without departing from the spirit or scope of the invention.

What I claim is:

1. A process of preparing a 2-mercaptobenzothiazole/tetraalkylthiuram disulfide mixture comprising forming an aqueous slurry of at least one tetraalkylthiuram disulfide having the following structural formula:

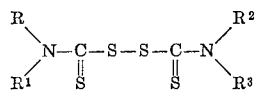

wherein R, R¹, R² and R³ are alkyl radicals having from 1 to 3 carbon atoms said slurry containing a reducing agent capable of providing sulfur dioxide in an amount sufficient to form an aqueous slurry which is substantially free of oxidizing agents formed during the preparation of said disulfide, to the extent that substantially no 2-mercaptobenzothiazole is converted to benzothiazolyl disulfide and then incorporating in said slurry 2-mercaptobenzothiazole or a compound capable of forming 2-marcaptobenzothiazole in the presence of an acid with the proviso that the compound capable of forming 2-mercaptobenzothiazole be incorporated under nonoxidizing acidic conditions sufficient to generate said 2-mercaptobenzothiazole.

2. The process according to claim 1 wherein the reducing agent is selected from the group consisting of sulfur dioxide, sulfurous acid, alkali sulfites and alkali bisulfites.

3. The process of claim 1 wherein the compound capable of forming 2-mercaptobenzothiazole in the presence of an acid is a water-soluble salt of 2-mercpatobenzothiazole.

4. The process according to claim 3 wherein the nonoxidizing acidic conditions are created by combining the tetraalkylthiuram disulfide slurry and at least one nonoxidizing, water-soluble acid prior to incorporating the water-soluble salt of 2-mercaptobenzothiazole with the tetraalkylthiuram disulfide slurry.

5. The process according to claim 4 wherein the nonoxidizing, water soluble acid is selected from the group consisting of hydrochloric acid, sulfuric acid, phosphoric acid and acetic acid.

6. The process according to claim 1 wherein the tetraalkylthiuram disulfide is selected from the group consisting of tetramethylthiuram disulfide and tetraethylthiuram disulfide, and the reducing agent is an alkali bisulfite.

7. The process according to claim 6 wherein the tetraalkylthiuram disulfide is tetramethylthiuram disulfide and the alkali bisulfite is sodium bisulfite.

8. The process according to claim 1 wherein 2-mercaptobenzothiazole is incorporated in the slurry which is substantially free of oxidizing agents.

9. The process according to claim 1 wherein a compound capable of forming 2-mercaptobenzothiazole in the presence of an acid is incorporated in the slurry which is substantially free of oxidizing agents.

10. The process according to claim 9 wherein the compound capable of forming 2-mercaptobenzothiazole is a water-soluble salt of 2-mercaptobenzothiazole.

11. The process according to claim 10 wherein the water-soluble salt of 2-mercaptobenzothiazole is the sodium salt of 2-mercaptobenzothiazole.

12. The process according to claim 5 wherein the acid is sulfuric acid.

13. The process of preparing a 2-mercaptobenzothiazole/tetramethylthiuram disulfide mixture comprising (A) combining (1) an aqueous slurry of tetramethylthiuram disulfide, said aqueous slurry containing residual oxides of nitrogen formed during the preparation of said disulfide, (2) sodium bisulfite in an amount sufficient to react with substantially all of the residual oxides of nitrogen, (3) sulfuric acid, and (B) subsequently combining the aqueous, acidic, nitrogen oxides-free tetramethylthiuram disulfide slurry with the sodium salt of 2-mercaptobenzothiazole, wherein the sulfuric acid is combined with the tetramethylthiuram disulfide slurry in an amount sufficient to substantially convert the sodium salt of 2-mercaptobenzothiazole to 2-mercaptobenzothiazole.

14. The process according to claim 13 wherein the sodium bisulfite is added to the tetramethylthiuram disulfide slurry prior to the addition of the sulfuric acid.

15. The process according to claim 1 wherein the tetraalkylthiuram disulfide is prepared by the oxidation of an appropriate dialkyldithiocarbamate in an aqueous medium in the presence of an oxidizing agent.

References Cited

UNITED STATES PATENTS

| | | | |
|---|---|---|---|
| 2,647,887 | 8/1953 | Goppel | 260—45.7 SU |
| 2,871,211 | 1/1959 | Mika | 260—567 |
| 3,255,250 | 6/1966 | Budd et al. | 260—567 |
| 3,419,521 | 12/1968 | Scott et al. | 260—785 |
| 3,477,968 | 11/1969 | Massoubre | 260—785 |
| 3,491,168 | 1/1970 | Short et al. | 260—785 |

RICHARD D. LOVERING, Primary Examiner

I. GLUCK, Assistant Examiner

U.S. Cl. X.R.

252—401; 260—45.7 S, 567, 785, 801, 814